United States Patent
Aebersold et al.

[19]

[11] Patent Number: 6,036,075

[45] Date of Patent: Mar. 14, 2000

[54] METHOD AND APPARATUS FOR CONNECTING TWO WORKPIECES TOGETHER

[75] Inventors: Hans Aebersold, Birmensdorf; Norbert Gross, Zürich; Werner Urech, Kaiserstuhl, all of Switzerland

[73] Assignee: Elpatronic AG, Bergdietikon, Switzerland

[21] Appl. No.: 08/647,174

[22] Filed: May 9, 1996

[30] Foreign Application Priority Data

May 15, 1995 [CH] Switzerland .......................... 01410/95

[51] Int. Cl.[7] .......................... B23K 37/04; B23K 37/047
[52] U.S. Cl. ................. 228/49.4; 414/14; 29/711
[58] Field of Search .......................... 228/4.1, 49.4, 228/44.3, 47.1, 173.6, 212; 219/158, 161; 269/56, 289 MR; 414/14, 18–20, 225, 226, 751, 753; 198/468.2; 29/429–431, 711

[56] References Cited

U.S. PATENT DOCUMENTS

| 3,618,844 | 11/1971 | Morley et al. .......................... 228/5.7 |
| 4,721,241 | 1/1988 | Yuasa et al. .......................... 228/5.7 |
| 4,811,936 | 3/1989 | Laymaster . | |
| 5,060,840 | 10/1991 | Lentz et al. . | |
| 5,172,846 | 12/1992 | Hayashi et al. .......................... 228/5.7 |
| 5,724,712 | 3/1998 | Bishop .......................... 29/430 |
| 5,749,511 | 5/1998 | Aebersold et al. .......................... 228/212 |

FOREIGN PATENT DOCUMENTS

| 0 438 615 A1 | 7/1991 | European Pat. Off. . |
| 0 565 088 A1 | 10/1993 | European Pat. Off. . |
| 0 565 846 A1 | 10/1993 | European Pat. Off. . |

*Primary Examiner*—Samuel M. Heinrich
*Attorney, Agent, or Firm*—McCormick, Paulding & Huber LLP

[57] ABSTRACT

In a method for connecting two workpieces together by welding, the workpieces are placed on clamping tables by a feed unit and are joined together by a welded seam. First, the workpieces are positioned in the feed unit. The feed unit is then traversed between the clamping tables and deposits the workpieces on them. Simultaneously with its feed movement, the unit expels the workpieces welded together in the preceding cycle.

7 Claims, 1 Drawing Sheet

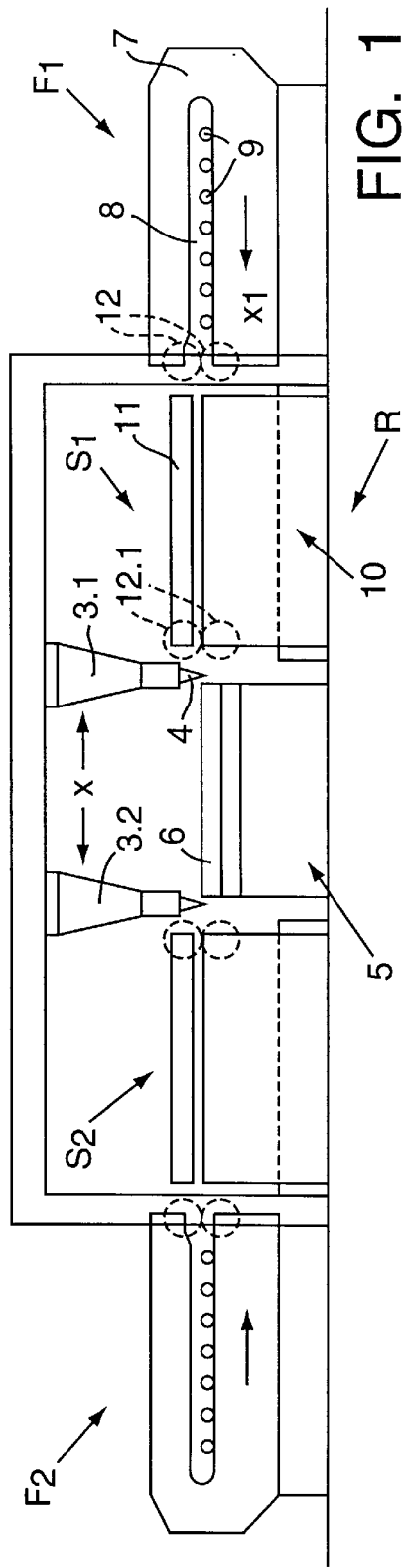
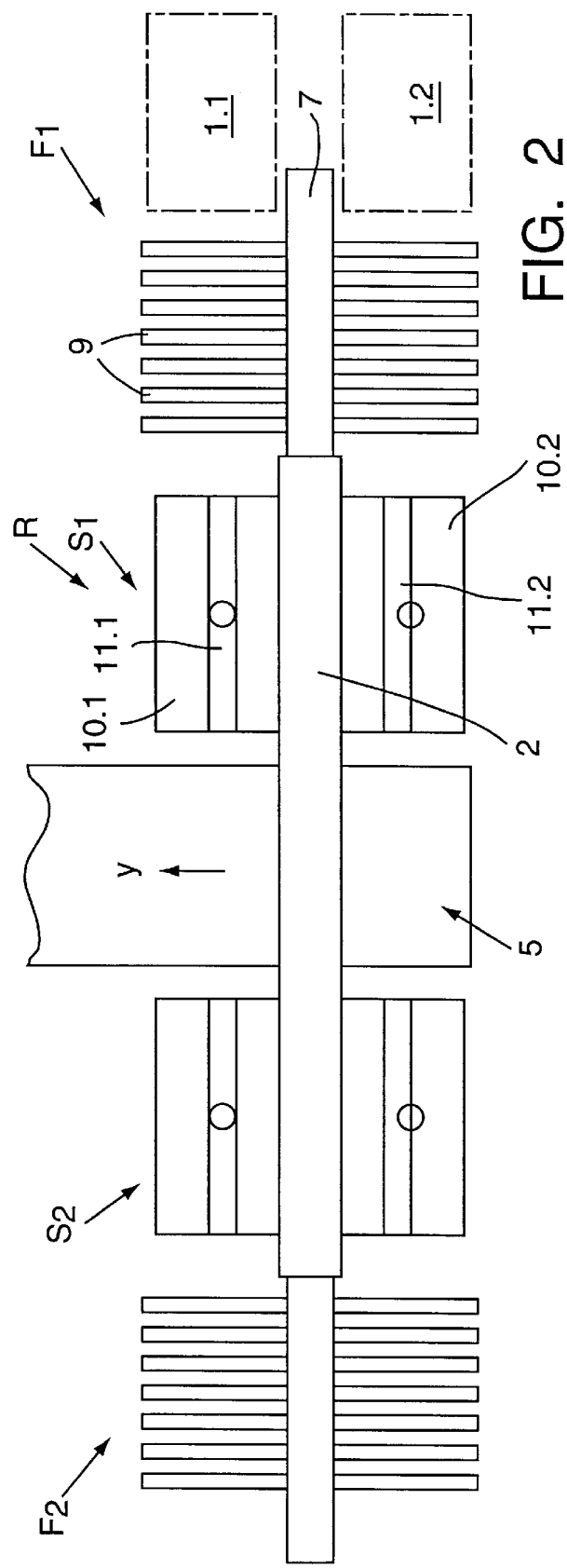

METHOD AND APPARATUS FOR CONNECTING TWO WORKPIECES TOGETHER

BACKGROUND OF THE INVENTION

The invention relates to a method for connecting two workpieces together by welding, in which the workpieces are placed on clamping tables by a feed unit and are joined together by a welded seam, and to an apparatus for the same.

Various welding processes are known for joining two workpieces together, particularly for the fabrication of body components for motor vehicles. Especially worthy of note are mash seam resistance roller welding and laser welding.

For all welding processes, apart from the quality of the welded seam, economy is particularly important. The workpieces should be welded with idle time kept to a minimum. Especially in the case of laser welding, it is indispensable to hold the workpieces fixed during the actual welding operation so that they do not slip and allow a gap to open up between the two workpieces.

The object which lies at the basis of the present invention is to develop a method and an apparatus of the abovementioned kind which enable two workpieces to be joined together in an economical manner.

SUMMARY OF THE INVENTION

The way in which this object is achieved is that the workpieces are positioned in the feed unit, and the feed unit is then traversed in between the clamping tables and deposits the workpieces and, as it is traversed, simultaneously ejects the workpieces welded together in a preceding cycle.

This arrangement has the advantage that the workpieces lie completely at rest during the welding operation and the butt joint or an overlap region is therefore unaltered. This arrangement allows the use of clamping tables with gripping and holding elements which hold the workpieces absolutely securely.

The welding unit, in this case a laser, transmits a laser beam which is deflected and directed through at least one laser focusing unit on to the butt joint. To monitor the laser beam, it will be found advantageous to provide a sensor running with the laser beam underneath the workpieces, ie. between the clamping tables, to determine the exact position of the laser beam. This makes it possible to determine whether the laser beam is performing its welding function in the region of the joint.

A significant feature is the feed unit, which operates automatically and performs several functions. For example it may comprise a gripping manipulator which has a horizontal slit into which the workpieces are inserted and in which the workpieces are held by clamping. This enables it to perform the function of positioning the workpieces.

Once the manipulator has received two workpieces, it is traversed into the welding station and transfers these workpieces to the clamping tables. Pressure may be applied to the outer edges of the workpieces, at right angles to the welding direction, by elements on the clamping tables, so that the joint gap is made as small as possible before the workpieces are fixed to the clamping tables. This is a considerable advantage especially in laser welding.

The butt joint is improved by also using a profiling roller as described in EP-A 565846. Also this profiling roller may be provided on the feed unit so that profiling is performed as the feed unit is traversed out of the welding station. Instead of, or in addition to, the profiling roller, dressing rollers may also be mounted on the feed unit, to dress the region of the weld seam prior to welding.

The welding station is preferably followed by a discharge unit. The newly welded workpieces are ejected by the feed unit as it brings new workpieces into the welding station, and are transported away by the discharge unit.

For greater efficiency of the entire apparatus, a second welding station with a second feed unit and a second laser focussing unit may be located on the other side of the discharge unit. Both welding stations are preferably served by the same laser. This makes the operation of the apparatus as a whole much more economical, as the common laser source can be cyclically switched between two welding stations. This can be performed by suitable deflector devices, such as mirrors for example. It would also be possible to have a parallel arrangement of two welding stations, with their feed units.

BRIEF DESCRIPTION OF THE DRAWINGS

Further advantages, features and particulars of the invention will be apparent from the following description of preferred embodiments given by way of example, and with reference to the drawings, in which:

FIG. 1 is a diagrammatic side view of an apparatus according to the invention for joining two workpieces together;

FIG. 2 is a plan view of the apparatus of FIG. 1.

DESCRIPTION OF THE PREFERRED EMBODIMENTS

In an apparatus R according to the invention two workpieces 1.1 and 1.2 (see FIG. 2) are to be joined together by laser welding. This apparatus R has feed units $F_1$ and $F_2$ on either side of a portal 2, and welding stations $S_1$ and $S_2$ inside the portal. The actual welding is performed using respective laser focussing units 3.1 and 3.2 which direct a laser beam 4 on to a butt joint between the two workpieces 1.1 and 1.2. Each laser focussing unit 3.1,3.2 is traversable along the portal 2 as indicated by the double headed arrow x, and is served by a single, normally fixed, laser (not shown).

A discharge unit 5 is provided between the two welding stations $S_1$ and $S_2$ for transporting away, in the direction y, the workpieces 1.1 and 1.2 after they have been welded together to form a compound panel. The discharge unit 5 may for example have a corresponding roller conveyor 6 as suggested in FIG. 1.

Since the construction of the feed units $F_1$ and $F_2$ and the welding stations $S_1$ and $S_2$ is identical, only one unit will now be described further.

The feed unit F has a gripping manipulator 7 which is capable of traversing in the direction $x_1$. The manipulator 7 has a horizontal slit 8 which is adjoined on both sides by receiving rollers 9. The workpieces 1.1 and 1.2 are laid on these receiving rollers 9 and are propelled towards one another and into the horizontal slit 8 by any desired mechanical handling means. They are then clamped in the horizontal slit 8 by means of any desired clamping elements.

The manipulator 7 then traversed into the welding station S between two clamping tables 10. The receiving rollers 9 remain in their position outside the portal 2.

The manipulator 7 then lays the workpieces 1.1 and 1.2 on the clamping tables 10 so that the workpieces are each held between the clamping table 10 and a pressure plate 11.1 and 11.2 respectively. To the pressure plates 11 a clamping pressure is applied, which may be hydraulic, pneumatic or mechanical as desired, so that the workpieces 1.1 and 1.2 are fixed as securely as possible.

The pressure acting on the workpieces 1.1 and 1.2 in the horizontal slit 8 is then released, and the manipulator 7 is traversed out of the welding station S in the opposite direction to the direction $x_1$. This exposes a butt joint (not shown) between the two workpieces 1.1 and 1.2, and the laser beam 4 is now guided along it, producing a welding seam and thus joining the two workpieces together.

Profile rollers 12 serve to improve the butt joint, ie. in particular to reduce the width of the joint gap. These profile rollers 12 produce a groove or similar profile near to the butt joint between the two workpieces 1.1 and 1.2, on one or both sides of the workpiece, as described in EP-A 565846. In the present embodiment, such profile rollers 12 or 12.1 may be mounted on the manipulator 7, eg. to form the profile as the manipulator is traversed out of the welding station. Alternatively, the profile rollers may be arranged ahead of the laser 3.

The feed unit F is reloaded with further workpieces while the welding operation is being performed. When the feed unit F is then traversed into the welding station S, these workpieces then expel the welded workpieces out of the welding station S and onto the discharge unit 5. During this transfer stage, the laser beam is directed through the other focussing unit onto a pair of workpieces brought to the second welding station. The laser welding operation is thus carried out alternately in the two welding stations.

We claim:

1. Apparatus for connecting two workpieces together by welding, comprised by a welding station having a welding unit served by a feed unit for the workpieces, wherein:

the feed unit includes a gripping manipulator with a horizontal slit into which two workpieces to be welded together are inserted in a transverse direction toward one another from opposite sides of the manipulator, and in which the two inserted workpieces are held, said manipulator being moveable in a longitudinal direction into the welding station; and the welding station includes at least one clamping table for receiving the workpieces from the gripping manipulator prior to welding and securing the workpieces during welding.

2. Apparatus according to claim 1, characterized in that the manipulator provided with at least one profiling roller.

3. Apparatus according to claim 1, characterized in that the manipulator has dressing rollers.

4. Apparatus according to claim 1, characterized in that the receiving rollers for the workpieces are provided on both sides of the slit.

5. Apparatus according to claim 1, characterized in that a discharge unit is coupled to the welding station.

6. Apparatus according to claim 5, characterized in that a second welding station with a welding unit and a second feed unit is connected on the other side of the discharge unit.

7. Apparatus according to claim 5, characterized in that a second welding station with a feed unit is provided parallel with the first welding station and feed unit.

* * * * *